United States Patent [19]
Adkins et al.

[11] Patent Number: 5,080,229
[45] Date of Patent: Jan. 14, 1992

[54] BLIND RIVET AND METHOD AND APPARATUS FOR MAKING SAME

[75] Inventors: Douglas H. Adkins, Anaheim; John P. Anderson, Norco; Robert L. Conly, Glendora; Thomas G. Singer, Huntington Beach, all of Calif.

[73] Assignee: The Hartwell Corporation, Placentia, Calif.

[21] Appl. No.: 566,971

[22] Filed: Aug. 13, 1990

[51] Int. Cl.⁵ ............................................. F16B 13/04
[52] U.S. Cl. .................................... 206/343; 206/820
[58] Field of Search ............... 206/343, 344, 345, 346, 206/820; 411/34, 39, 40, 41, 42, 43, 70

[56] References Cited

U.S. PATENT DOCUMENTS

| | | | |
|---|---|---|---|
| 3,938,657 | 2/1976 | David | 206/343 |
| 3,974,913 | 8/1976 | Hirsch | 206/344 |
| 4,222,304 | 9/1980 | Yoshida et al. | 411/34 X |
| 4,402,638 | 9/1983 | Tanaka | 411/34 |

Primary Examiner—Paul T. Sewell
Assistant Examiner—Jacob K. Ackun, Jr.
Attorney, Agent, or Firm—Harris, Kern, Wallen & Tinsley

[57] ABSTRACT

Apparatus and method for molding a strip of blind rivets, with each of the rivets having a pin within a sleeve and with the pin having a pulling head and shank, including a strip advance rod mounted in the apparatus for movement between first and second positions, a set of pin mold cavities and a set of sleeve mold cavities, a first runner for feeding the pin mold cavities and including a band around the rod, a second runner overlying the first runner for feeding the sleeve mold cavities, opposing mold members defining the sets of cavities and a sprue for feeding molding material to the runners, with the rod and strip moving together when the mold members are out of engagement for advancing the molded parts, and with the rod moving through the strip when the mold members are in engagement for returning the rod to the first position.

9 Claims, 4 Drawing Sheets

BLIND RIVET AND METHOD AND APPARATUS FOR MAKING SAME

BACKGROUND OF THE INVENTION

This invention relates to blind rivets and to a method and apparatus for manufacture of blind rivets. Blind rivets have been produced in strips, with each rivet having a pin within a sleeve, with the rivet being fixed in placed by pulling the pin in the sleeve to expand the sleeve for fastening material between the expanded portion of the sleeve and the flange of the sleeve. Rivets of this type are shown in U.S. Pat. 4,222,304, and may be fixed in place by a pulling gun of the type shown in U.S. Pat. No. 4,131,009.

In the prior art rivet shown in U.S. Pat. No. 4 222 304, a plurality of pins is molded in a first set of cavities. Then this set of pins is lifted from the first set of cavities and positioned in a second set of cavities where the sleeves are molded around the pins. Interconnecting strips are molded between the heads of the pins to provide the strip of rivets. This patent does not disclose any mechanism for moving the molded pins from the pin cavities to the sleeve cavities.

In the cavities, the individual pins are aligned with the individual sleeves, with the pin cavities being fed from a runner through the pulling head of the pin and with the sleeve cavities being fed from the tail end of the pin. With this configuration, there is a runner at each end of the finished rivets.

In another prior art arrangement, which does not appear to be the subject of an issued patent, the set of sleeve cavities is positioned in parallel with the set of pin cavities, with all cavities being fed from the tail ends through the same runner.

After a molding operation is completed, the mold members are opened and the molded strip is advanced along a path perpendicular to the individual cavities, with the molded pins being positioned in the sleeve cavities for the next molding operation of sleeves about the pins.

The molded strip is advanced by a reciprocating carrier which is positioned at the head end of the pin cavities, with the pin heads molded about a blade of the carrier which forms a dovetail groove in the pin heads.

This later prior art arrangement provides for automatic advance of the molded pins into the sleeve cavities and for formation of a continuous strip of molded rivets. However problems have been encountered in the use of this apparatus.

Accordingly, it is an object of the present invention to provide a new and improved blind rivet strip and method and apparatus for forming the blind rivet strip which will result in a less expensive and more reliable tool and one which is more easily maintained and which can be operated at higher production rates.

It is another object of the invention to configure the cavities, runners and material feeding sprue to reduce the amount of molding material that is wasted.

The utilization of the blade and the dovetail slot in the pin head for strip advance results in flash and debris in the slot, which causes undesirable material wear and jams in the pulling gun. Accordingly it is another object of the invention to provide an automatic molding apparatus and method which does not utilize a groove in the rivet pulling head.

Other objects, advantages, features and results will more fully appear in the course of the following description.

SUMMARY OF THE INVENTION

Apparatus and method for molding a strip of blind rivets, with each of the rivets having a pin within a sleeve and with the pin having a pulling head and shank, including a strip advance member, typically a rod, mounted in the apparatus for movement between first and second positions, a set of pin mold cavities and a set of sleeve mold cavities, a first runner for feeding the pin mold cavities and including a band around the advance member, a second runner overlying the first runner for feeding the sleeve mold cavities, opposing mold members defining the sets of cavities and a sprue for feeding molding material to the runners, with the advance member and strip moving together when the mold members are out of engagement for advancing the molded parts, and with the advance member moving through the strip when the mold members are in engagement for returning the advance member to the first position.

In the preferred embodiment of the invention the two strips of the blind rivets are formed in the molding operation, with the second strip fed from the same runners as the first strip. Also, the sprue feeds into the midpoint of the runners and is disposed perpendicular to the runners and to the rivets, for improved feeding and reduced waste material. Preferably, a band is molded around the advance member at each cavity, with the second runner bands overlying the first runner bands, and with the bands having gaps opposite the runner. The invention also includes a strip of the blind rivets as produced by the method and apparatus.

DESCRIPTION OF THE PREFERRED EMBODIMENT

Figure 1:
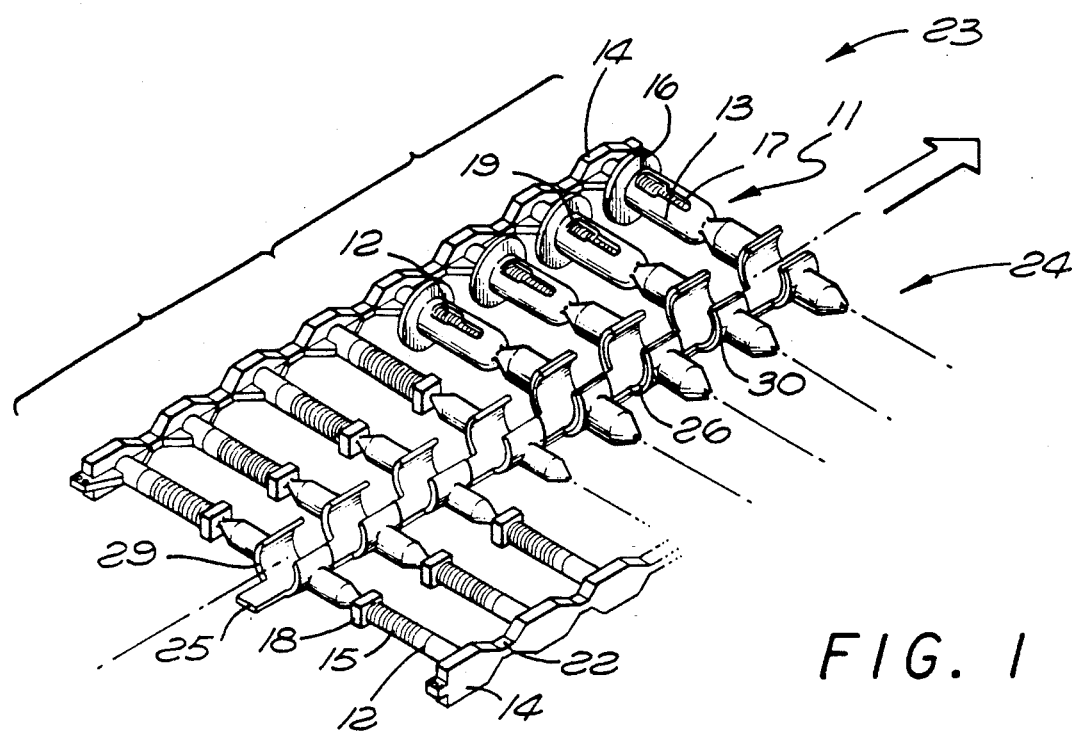
FIG. 1 is a perspective view of a strip of the blind rivets after leaving the molding apparatus and prior to separating the strip from the molding runners and incorporating the presently preferred embodiment of the invention.
Figure 2:
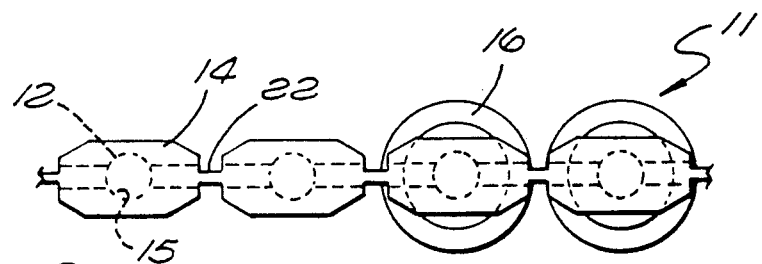
FIG. 2 is an enlarged head end view of four of the molded components of FIG. 1.
Figure 3:
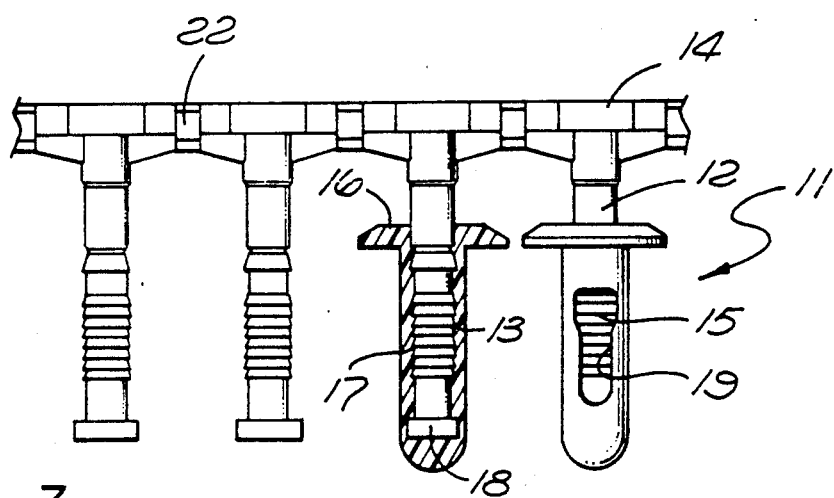
FIG. 3 is a side view of the components of FIG. 2.

A finished rivet 11, as shown in FIGS. 1-3, comprises a pin 12 within a sleeve 13. The pin has a pulling head 14 and a shank 15, and the sleeve has a flange 16 and a body 17. The construction and use of such a rivet is conventional, and reference may be made to the aforementioned U.S. Pat. Nos. 4,131,009 and 4,222,304 for additional information on the blind rivet and its use. Briefly, the body 17 of the blind rivet is inserted through aligned openings of two pieces of material to be joined, with the flange 16 engaging the surface of one of the materials. The pulling head 14 of the pin is gripped by the pulling gun, and a restraining force is applied to the flange 16 of the sleeve. The pulling force on the enlarged tail end 18 of the pin causes the body 17 of the sleeve to buckle, compressing the materials to be joined between the flange 16 and the buckled body 17. The portion of the shank 15 of the pin projecting above the flange is removed, completing the riveting operation. Typically, openings 19 are provided in the body 17 of the sleeve for improved buckling operation.

The heads of the pins are joined by break-away sections 22 which retain the finished rivets in the desired strip form, while permitting installation of individual rivets during the riveting operation.

In the preferred embodiment as shown in FIG. 1, two strips of rivets 23, 24 are produced in the same operation, with the two strips being formed on opposite sides of a first runner 25 and a second runner 26. Preferably, the two strips lie on the same plane, as shown in FIG. 1.

Figure 4:
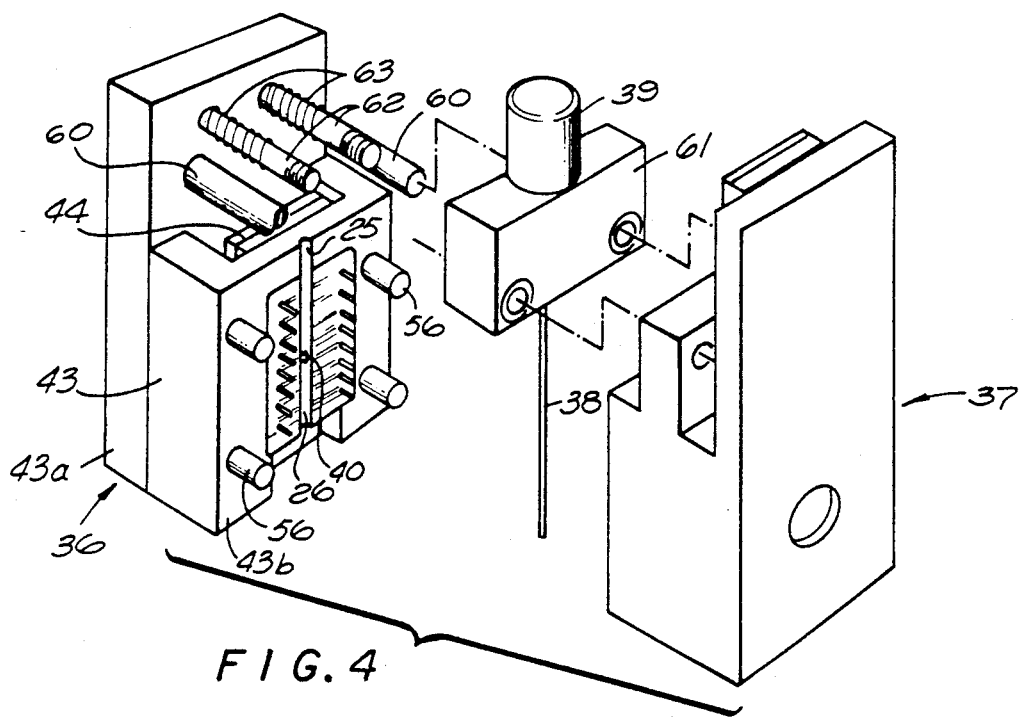
FIG. 4 is an exploded isometric view of the presently preferred embodiment of the molding apparatus.

The pins are formed in pin cavities 27 and the sleeves are formed in sleeve cavities 28 as shown in FIG. 4. The pin cavities are fed at the tail ends by the runner 25 through bands 29, and the sleeve cavities are fed in the same manner by the runner 26 through bands 30, with the second runner 26 and bands 30 overlying first runner 25 and bands 29.

In the preferred configuration illustrated, a band is provided for each pair of opposed cavities, and a gap is provided in each band opposite the runner. After the molding is completed, each strip is separated from the runners and is ready for use. While slotted bands are preferred, other band shapes can be used. For example, the runners could have a cylindrical shape and completely surround the rod.

Figure 5:
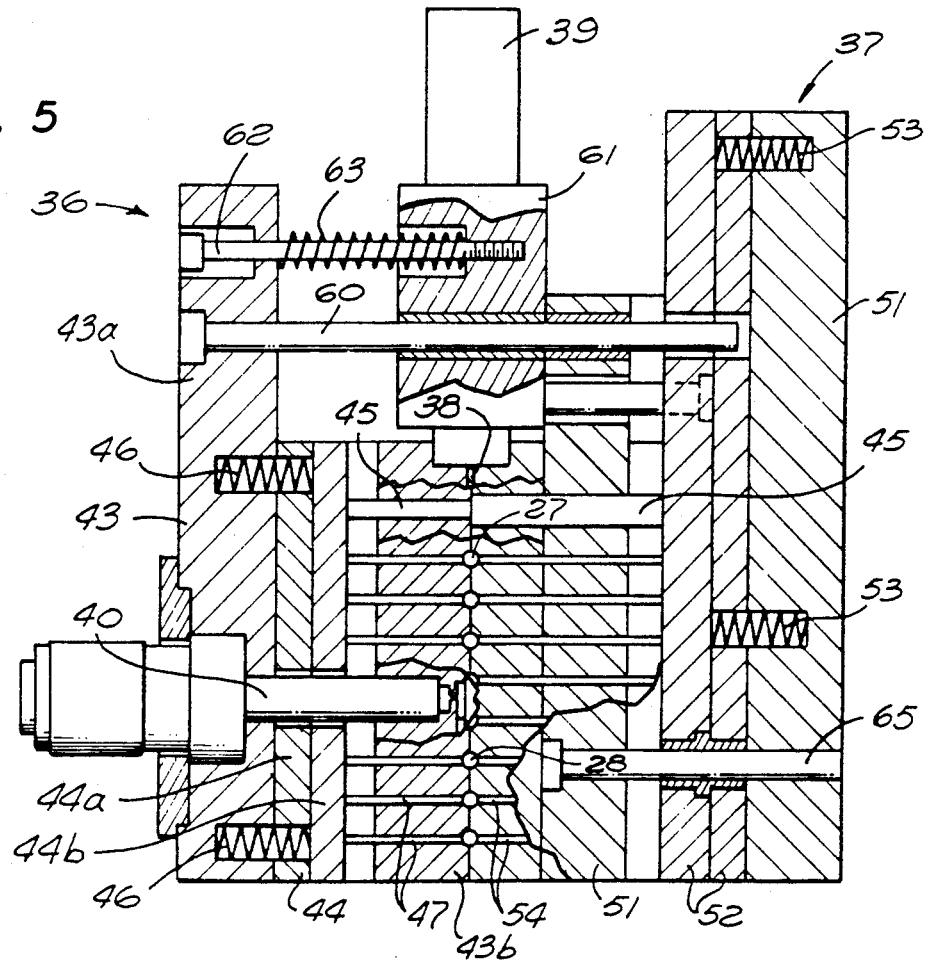
FIG. 5 is an enlarged side view in section of the apparatus of FIG. 4, with the mold closed.

The molding apparatus as shown in FIGS. 4 and 5 includes opposed mold members 36, 37 and an advance member, preferably a rod 38, carried on an advance mechanism 39. The mold members 36 and 37 are sometimes referred to as the hot half and cold half, respectively, with the two halfs meeting at a parting line. A feed unit 40 is positioned in the mold member 36 for feeding molding material through the runners. The sprue from the feed unit 40 stays molten because a hot sprue bushing is used. When runners are advanced, there is no sprue attached because it never solidifies. The molding material feed unit 40 may be conventional, and is not shown in FIGS. 6-9 in order to simplify the drawing figures. The advance member is shown as a circular cross-section rod, but other shapes can be used. For example, a dovetail cross-section could be used; any flash around the member would not be a problem because the runner is removed before the rivets are used in the setting tool. Also the rod could have a longitudinal flat or groove to prevent the rivets from rotating on the rod when they are ejected from the cavities.

Figure 6:
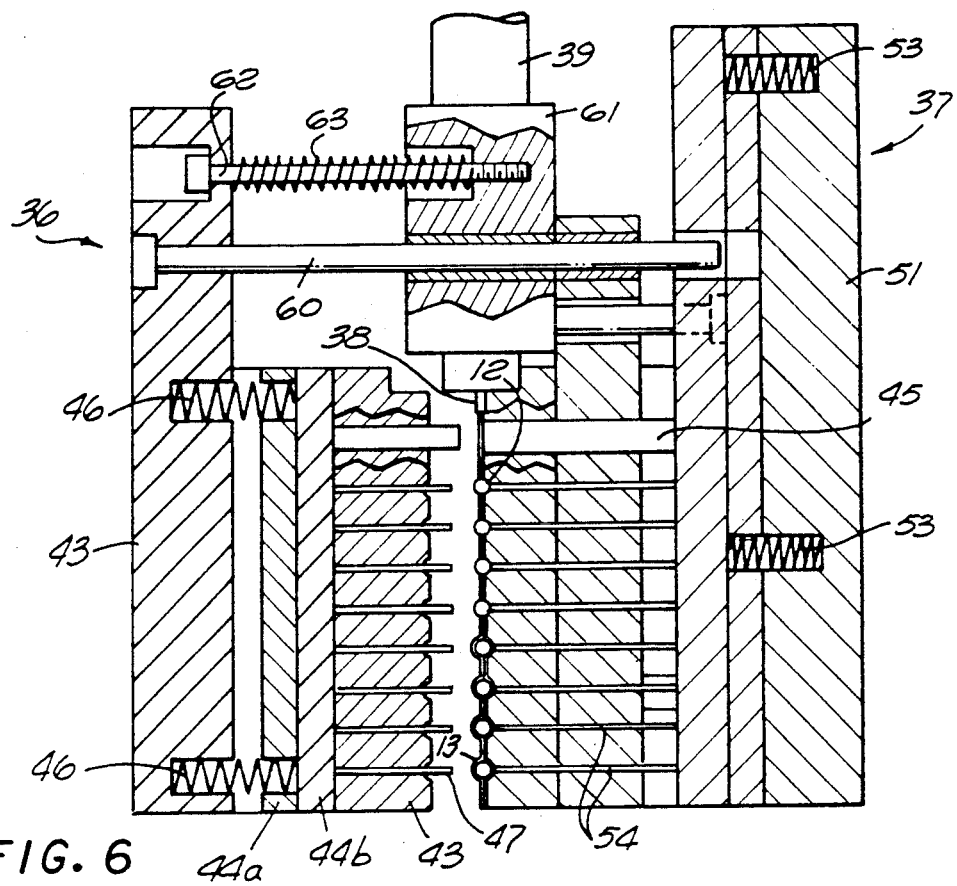
FIGS. 6, 7, 8 and 9 are views similar to that of FIG. 5 showing successive steps in the molding operation.

The mold member 36 includes a transfer assembly 43 and an ejector assembly 44, with the ejector assembly moving relative to the transfer assembly on a plurality of return pins 45. The transfer assembly 43 includes a clamp plate 43a and a support plate 43b, with the ejector assembly positioned between the plates 43a and 43b. The ejector assembly 44 typically is formed of two plates 44a, 44b, with compression springs 46 in the plate 44a urging the ejector assembly 44 toward the mold cavities. The return pins 45 and ejector pins 47 are attached to the plate 44b of the ejector assembly 44 and slide freely in the transfer assembly 43, moving from a position outside the cavities as shown in FIG. 5 to a position in the cavities as shown in FIG. 6 when the ejector assembly 44 is moved by the springs 46 during opening of the mold. This operation ejects the molded pins and sleeves from the cavities.

The mold member 37 is similarly constructed with a transfer assembly 51, an ejector assembly 52, and springs 53. Ejector pins 54 in the ejector assembly 52 move the molded strips out of the other half of the cavities as the mold continues to open to the position of FIG. 7. Leader pins or rods 56 are used as guide pins to align the two halves of the mold with each other when the mold is in the closed position.

The mold member 37 moves relative to the mold member 36. The rod advance mechanism 39 rides on a block 61 carried on rods 60 mounted in mold member 36, with springs 63 on stop screws 62 urging the block 61 away from the mold member 36. This construction is used in a conventional molding machine which provides for opening and closing of mold members, ejection of molded parts, and reciprocating action. One or more guide pins 65 may be provided for the ejector assemblies if desired.

The mold is shown fully closed in FIG. 5, with the advance rod 38 positioned in the runner space. The molding material is injected through the unit 40 and the runners into the cavities. FIG. 6 shows the mold member 37 and block 61 moved away from the mold member 43 with the molded parts ejected from the ejector assembly 44.

Figure 7:
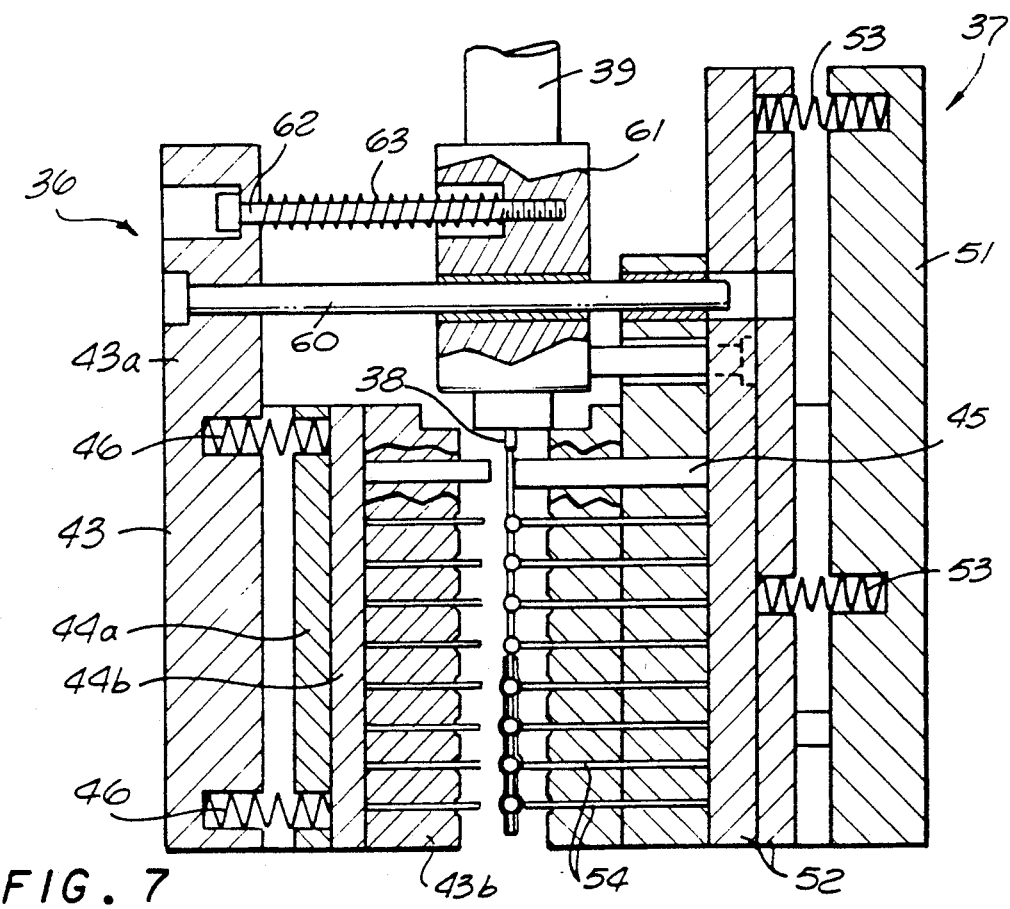

In FIG. 7, the mold member 37 is moved further from the mold member 36 while the block 61 remains in the position of FIG. 6. The molded parts are now ejected from the other half of the cavities by the ejector pins 54.

Figure 8:
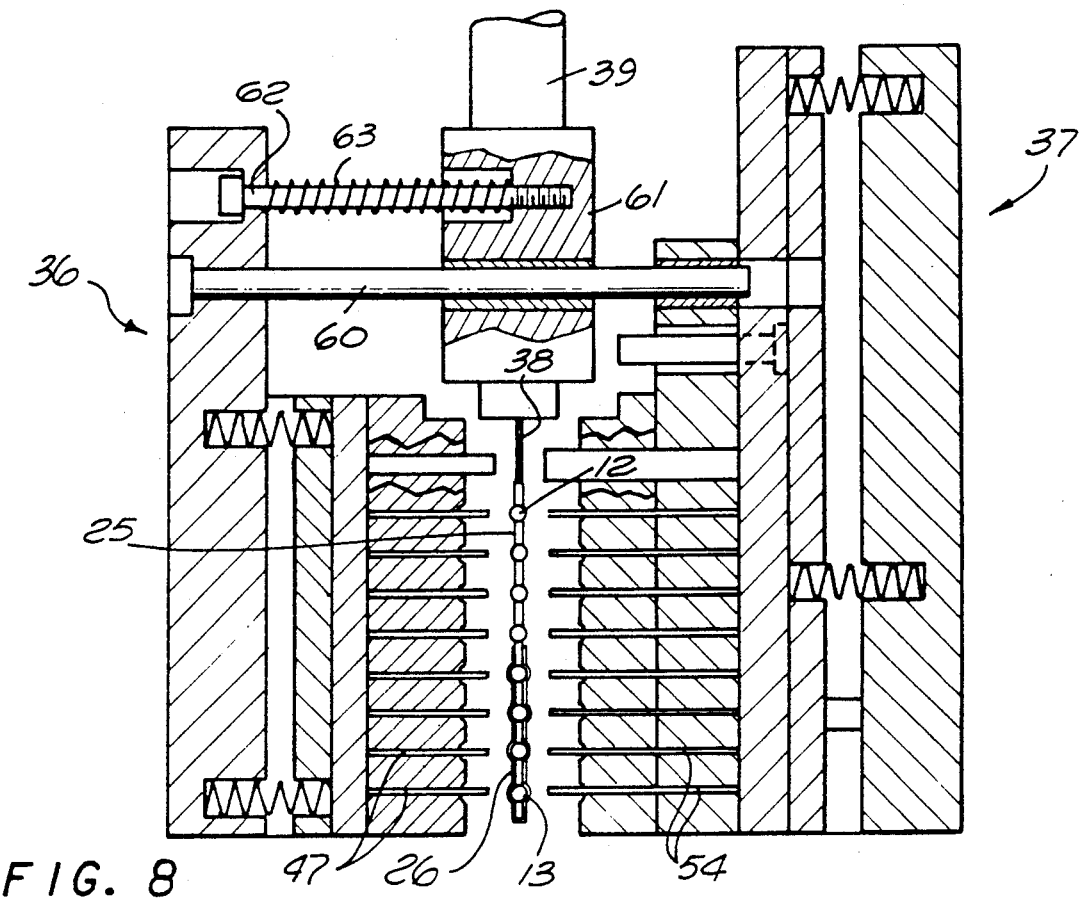
Figure 9:
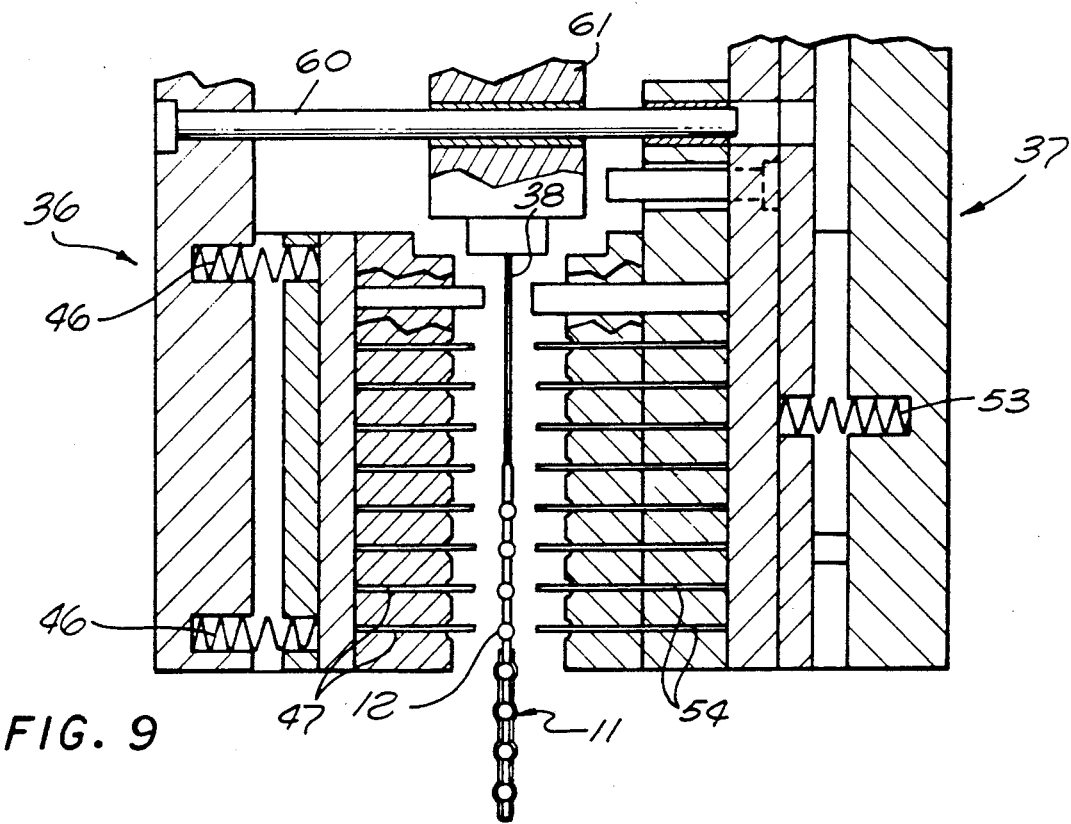

In FIG. 8, the mold member 37 continues to move away from the mold member 36, leaving the molded components clear of both halves of the mold cavities and both sets of ejector pins. The final step in the mold opening operation is shown in FIG. 9, with the advance rod 38 being moved downward so that the finished rivets 11 clear the mold, and so that the pins 12 are positioned opposite the sleeve cavities. The mold is now closed, returning it to the position of FIG. 5 ready for another injection of molding material to form sleeves around the pins in the sleeve mold cavities and to form another set of pins in the pin cavities. After the mold is closed with the pins in the sleeve cavities, the advance rod 38 is raised to the position of FIG. 5 pulling the rod through the bands and out of the finished rivets. The molding operation is repeated to produce the continuous strip of blind rivets.

In the some alternative arrangements, the tips of the rivets could be made with a piercing point for installation into soft materials without pre-drilled holes. The rivet flange instead of having a flat circular shape could be configured to facilitate the attachment of various items such as electrical cables, decorative molding, pictures, insulation, and the like.

An advantage of this new molding method and apparatus is that they provide for an increase in productivity and in quality, by molding two strips of rivets instead of one and reducing flashing problems caused by the presently used transfer blade in the rivet head.

Another advantage of this new mold design is that it allows the use of a conventional molding machine instead of the specialized four slide type used in the past. The four slide type molding machines are quite versatile but do not have a good clamp arrangement to hold the mold closed.

The main platen of the four slide machine that supports the mold and clamp assembly, deflects when high injection pressure and clamp force are used, and this allows the mold to open up at the parting line resulting in flash on the rivets.

On a four slide type machine the rod advance mechanism is mounted stationary to the machine and both halves of the mold are moving. On the new mold design the transfer assembly of the hot half of the mold is stationary, while the hot half ejector assembly, the rod advance mechanism and the cold half of the mold move. This difference is what allows the new mold to be used on conventional type molding machines which generally have better electrical and hydraulic equipment for controlling molding temperatures and pressures.

We claim:

1. A strip of blind rivets, each of said rivets having a pin within a sleeve, with the pin having a pulling head and shank, and with the sleeves molded around the pins,
    a first runner interconnecting said pins at said shanks, said first runner including band means for adhering the first runner to an advance member, and
    a second runner interconnecting said sleeves and overlying said first runner.

2. A strip as defined in claim 1 with said pulling heads detachably joined together.

3. A strip as defined in claim 2 with second runner band means overlying said first runner band.

4. A strip as defined in claim 3 with said band means including a first runner band for each of said pins and a second runner band for each of said sleeves.

5. A strip as defined in claim 4 with each of said bands having a gap opposite the runner.

6. A strip as defined in claim 1 including a second strip of said blind rivets joined to said runners in opposing relation to said one strip.

7. A strip as defined in claim 6 with second runner band means overlying said first runner band means.

8. A strip as defined in claim 7 wherein said band means includes bands for each pin and sleeve along the runners.

9. A strip as defined in claim 8 with each band having a gap opposite the runner.

* * * * *